United States Patent
Skala

(10) Patent No.: US 8,298,713 B2
(45) Date of Patent: Oct. 30, 2012

(54) THERMALLY INTEGRATED FUEL CELL HUMIDIFIER FOR RAPID WARM-UP

(75) Inventor: Glenn W. Skala, Churchville, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 1704 days.

(21) Appl. No.: 11/586,257

(22) Filed: Oct. 25, 2006

(65) Prior Publication Data

US 2008/0102335 A1    May 1, 2008

(51) Int. Cl.
 *H01M 8/04* (2006.01)
(52) U.S. Cl. .......................................... 429/434; 429/456
(58) Field of Classification Search .............. 429/12–46, 429/434, 456
See application file for complete search history.

(56) References Cited

U.S. PATENT DOCUMENTS

| | | | |
|---|---|---|---|
| 6,186,254 B1 * | 2/2001 | Mufford et al. ................ | 429/13 |
| 6,284,399 B1 | 9/2001 | Oko et al. | |
| 6,551,731 B1 * | 4/2003 | Berg et al. .................... | 429/13 |
| 6,797,421 B2 | 9/2004 | Assarabowski | |
| 6,864,005 B2 | 3/2005 | Mossman | |
| 7,534,520 B2 | 5/2009 | Jufuku | |
| 7,651,799 B2 | 1/2010 | Gunther et al. | |
| 2002/0037444 A1 | 3/2002 | Bette et al. | |
| 2004/0157098 A1 * | 8/2004 | Wexel et al. ................... | 429/26 |
| 2004/0234829 A1 * | 11/2004 | Sederquist et al. ............ | 429/26 |
| 2005/0214605 A1 * | 9/2005 | Saitoh et al. .................. | 429/22 |
| 2008/0081238 A1 | 4/2008 | Becker et al. | |

FOREIGN PATENT DOCUMENTS

| | | |
|---|---|---|
| JP | 2004-273347 A | 9/2004 |
| JP | 2004-281201 A | 10/2004 |
| JP | 2005-251493 A | 9/2005 |
| JP | 2006-049200 A | 2/2006 |
| JP | 2006-179268 A | 7/2006 |
| WO | WO 2004/070856 A2 | 8/2004 |

\* cited by examiner

*Primary Examiner* — Patrick Ryan
*Assistant Examiner* — Brent Thomas
(74) *Attorney, Agent, or Firm* — John A. Miller; Miller IP Group, PLC

(57) ABSTRACT

A fuel cell stack module that includes a fuel cell stack and an end unit that are part of a thermally integrated assembly. The module also includes a charge air cooler and a WVT unit integrated within the end unit. A cooling fluid is pumped through a line in the end unit and the fuel cell stack by a pump. The cooling fluid is pumped through the charge air cooler to reduce the temperature of the cathode inlet airflow sent to the fuel cell stack. The reduced temperature cathode inlet air from the charge air cooler is sent to the WVT unit where it is humidified. Cathode exhaust gas from the fuel cell stack can be sent to the WVT unit to provide the humidification to humidify the cathode inlet air. A by-pass valve provided within the end unit can be employed to by-pass the WVT unit during cold-starts.

18 Claims, 3 Drawing Sheets

THERMALLY INTEGRATED FUEL CELL HUMIDIFIER FOR RAPID WARM-UP

BACKGROUND OF THE INVENTION

1. Field of the Invention

This invention relates generally to a technique for cooling and humidifying the charge air applied to the cathode side of a fuel cell stack and, more particularly, to a fuel cell stack module that includes a fuel cell stack, a charge air cooler and a water vapor transfer unit thermally integrated within an end unit of the module.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer electrolyte proton conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs are relatively expensive to manufacture and require certain conditions for effective operation.

Several fuel cells are typically combined in a fuel cell stack to generate the desired power. For example, a typical fuel cell stack for a vehicle may have two hundred or more stacked fuel cells. The fuel cell stack receives a cathode input gas, typically a flow of air forced through the stack by a compressor. Not all of the oxygen is consumed by the stack and some of the air is output as a cathode exhaust gas that may include water as a stack by-product. The fuel cell stack also receives an anode hydrogen input gas that flows into the anode side of the stack.

The fuel cell stack includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

As is well understood in the art, fuel cell membranes operate with a certain relative humidity (RH) so that the ionic resistance across the membrane is low enough to effectively conduct protons. The relative humidity of the cathode outlet gas from the fuel cell stack is typically controlled to control the relative humidity of the membranes by controlling several stack operating parameters, such as stack pressure, temperature, cathode stoichiometry and the relative humidity of the cathode air into the stack.

As mentioned above, water is generated as a by-product of the stack operation. Therefore, the cathode exhaust gas from the stack will include water vapor and liquid water. It is known in the art to use a water vapor transfer (WVT) unit to capture some of the water in the cathode exhaust gas, and use the water to humidify the cathode input airflow. Typically, the WVT unit includes flow channels and membranes. Water in the cathode exhaust gas flowing down the flow channels at one side of the membrane is absorbed by the membrane and transferred to the cathode air stream flowing down the flow channels at the other side of the membrane.

The cathode inlet air is heated by the compressor. It is known in the art to cool the cathode inlet air using a charge air cooler prior to it being sent to the WVT unit so that the cathode inlet air is at the proper temperature for optimum water vapor transfer performance. In one known system, the stack cooling fluid that is used to cool the fuel cell stack is also used to cool the cathode inlet air so that the temperature of the cathode inlet air is about the same as the stack temperature.

As discussed above, known fuel cell systems have used discrete charge air coolers and humidifiers that are mostly surrounded by ambient air and exposed to under-hood vehicle airflows. Because of this, typically two things can happen that slows or reduces the warm-up of the fuel cell stack at system start-up. First, the cold cooling fluid carries the compressed air heat away from the fuel cell stack, thus maintaining the charge air going into the charge air cooler cold for some period of time. Second, the interconnected plumbing and control valves between the cathode gas outlet and the WVT unit provide a significant thermal mass to warm up, further slowing the warm-up of the WVT unit.

Further, it is desirable to contain the heat loss of the various units in the fuel cell system so that the heat loss does not cause undesirable condensation. Particularly, liquid water in the system causes various degradation problems with components in the system, as well as complications during freeze starts. Thus, it is desirable to maintain single-phase water vapor in the various gas streams in the system as much as possible. Also, it is desirable to minimize heat losses from the fuel cell system because a fuel cell stack has a relatively high efficiency that could provide stack performance issues at low power and/or low ambient temperature conditions.

SUMMARY OF THE INVENTION

In accordance with the teachings of the present invention, a fuel cell stack module is disclosed that includes a fuel cell stack and an end unit that are part of a thermally integrated assembly. The fuel cell stack module also includes a charge air cooler and a WVT unit integrated within the end unit. Cooling fluid is pumped through a cooling fluid line in the end unit and the fuel cell stack by a pump, where the pump may be positioned within the end unit. The cooling fluid is pumped through the charge air cooler to reduce the temperature of the cathode inlet airflow sent to the fuel cell stack. The reduced temperature cathode inlet air from the charge air cooler is sent to the WVT unit where it is humidified. Cathode exhaust gas from the fuel cell stack can be sent to the WVT unit to provide the humidification to humidify the cathode inlet air. A by-pass valve provided within the end unit can be employed to by-pass the WVT unit during cold-starts.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell stack module employing a charge air cooler and a WVT unit thermally integrated within end hardware of the module is merely exemplary in nature, and is in no way intended to limit the invention or its applications or uses.

Figure 1:
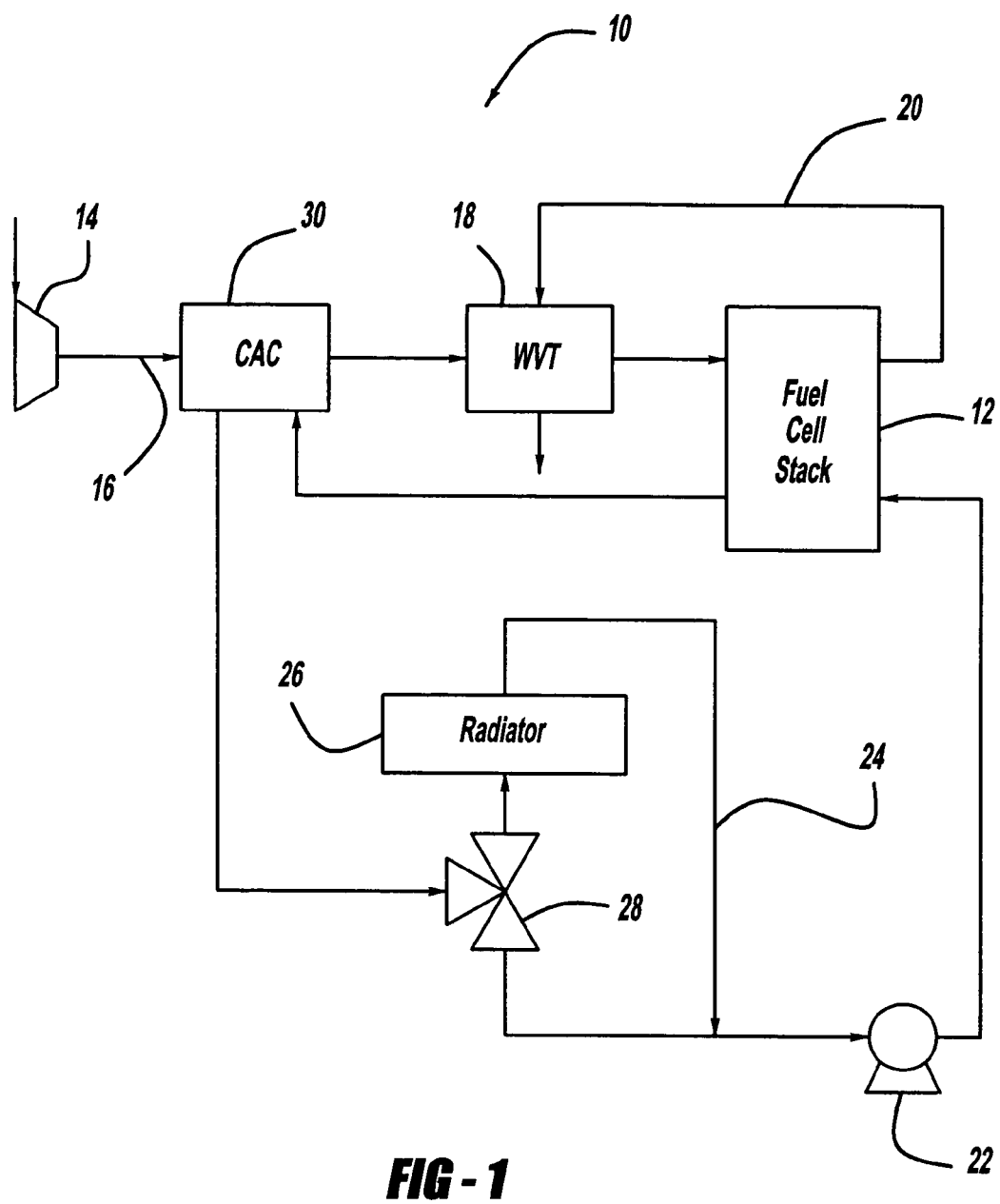
FIG. 1 is a general schematic block diagram of a fuel cell system including a WVT unit and a charge air cooler.

FIG. 1 is a general schematic block diagram of a fuel cell system 10 including a fuel cell stack 12. A compressor 14 provides a flow of air to the cathode side of the stack 12 on cathode input line 16. The flow of air from the compressor 18 is sent through a WVT unit 18 to be humidified. A cathode exhaust gas is output from the stack 12 on cathode output line 20. The cathode exhaust gas includes a considerable amount of water and water vapor as a result of the by-product of the electro-chemical process in the stack 12. As is well understood in the art, the cathode exhaust gas can be sent to the WVT unit 18 to provide the humidification for the cathode inlet airflow on the line 16. The fuel cell system 10 can also includes a charge air cooler (CAC) 30 that reduces the temperature of the cathode inlet air so that it can better be humidified by the WVT unit 18.

The fuel cell system 10 includes a pump 22 that pumps a cooling fluid through cooling fluid flow channels in the fuel cell stack 12 and a coolant loop 24 outside of the fuel cell stack 12, as is well understood to those skilled in the art. The heated cooling fluid from the fuel cell stack 12 is sent to the CAC 30 for reducing the temperature of the cathode charge air. The cooling fluid then flows to a three-way valve 28, which can selectively direct the cooling fluid to a radiator 26 where it is reduced in temperature before being sent back to the fuel cell stack 12. The radiator 26 may include a fan (not shown) that drives cooling air through the radiator 26 to provide the cooling, as is well understood in the art. For low temperature starts and the like, the valve 28 can by-pass the radiator and send the cooling fluid directly to the pump 22.

Figure 2:
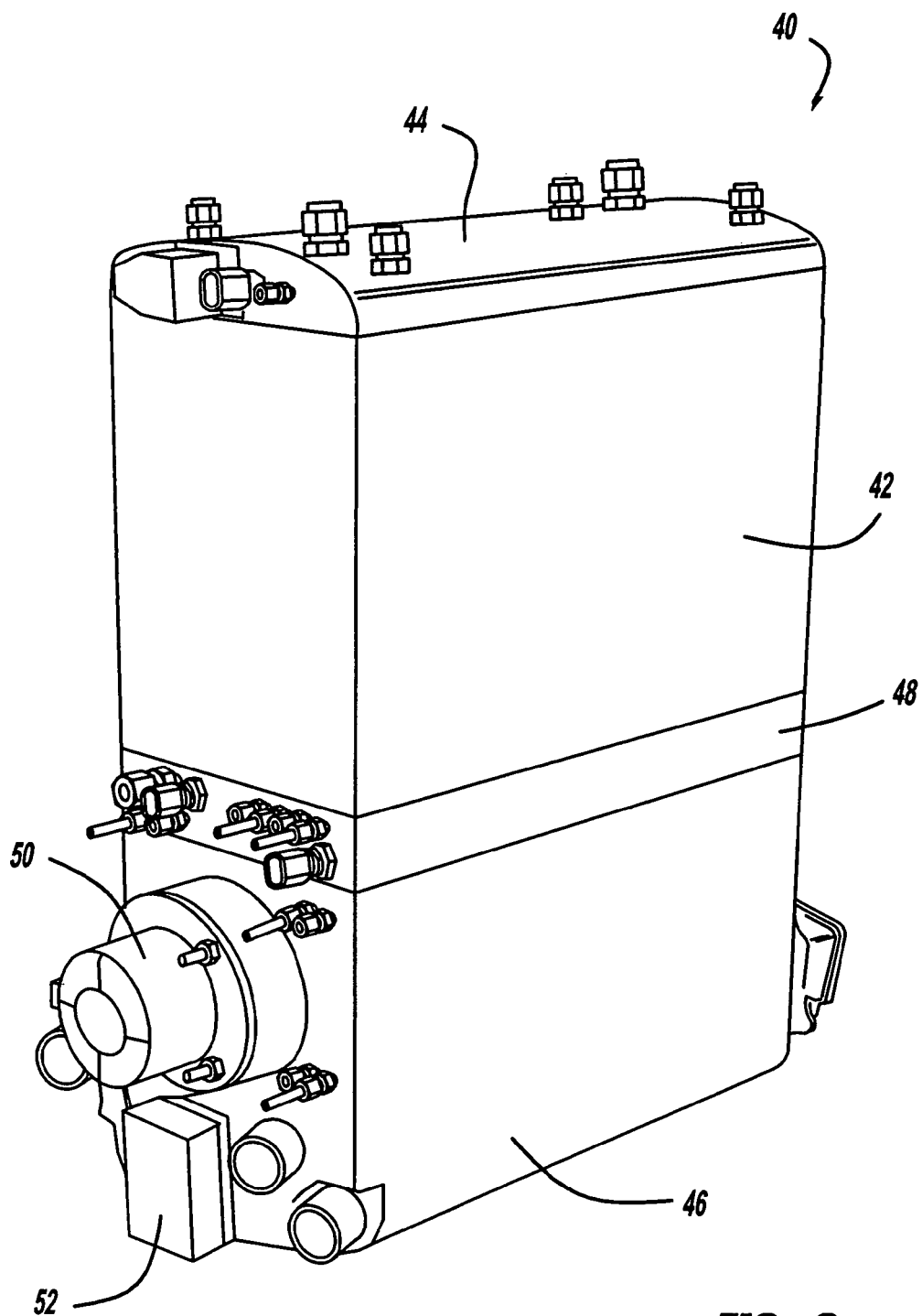
FIG. 2 is a perspective view of a fuel cell stack module including a charge air cooler and a WVT unit positioned within end hardware of the module, according to an embodiment of the present invention.

FIG. 2 is a perspective view of a fuel cell stack module 40 including a fuel cell stack 42, according to an embodiment of the present invention. The fuel cell stack module 40 also includes a stack upper end unit 44, a stack lower end unit 46 and a stack base plate 48 between the stack 42 and the lower end unit 46. An assembly 50 of pumps and valves is coupled to an outside of the housing for the lower end unit 46. Further, a cooling fluid mechanism 52 is coupled to the housing of the end unit 46. The stack 42, the end units 44 and 46, and the base plate 48 are integrated as part of a thermal assembly. Various connectors, fixtures and plumbing accessories are shown connected to the module 40 where the various fluids go into and come out of the stack module 40.

Figure 3:
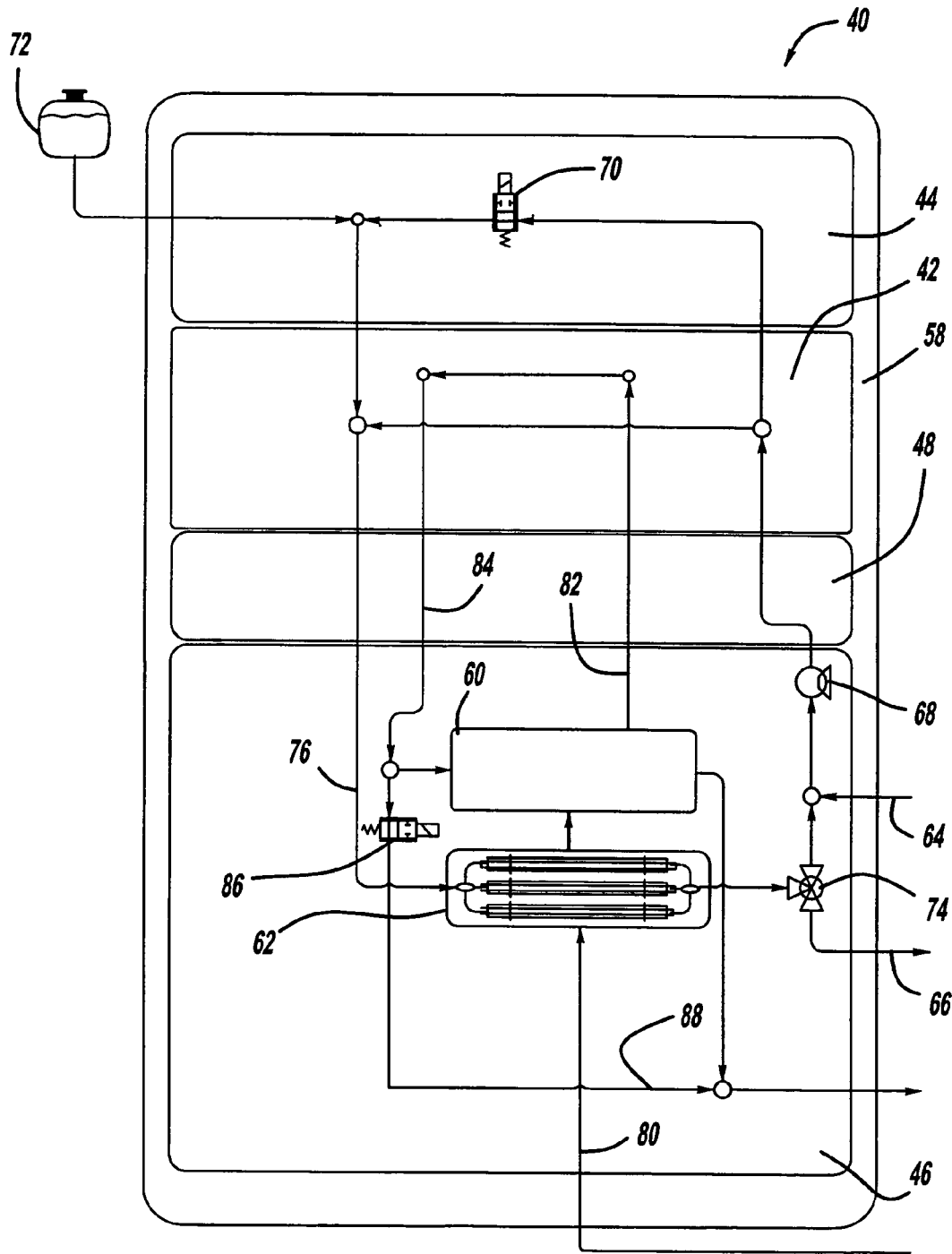
FIG. 3 is a mechanization diagram without the anode sub-system of the fuel cell stack module shown in FIG. 2.

FIG. 3 is a mechanization diagram of the fuel cell stack module 40. The anode sub-system and associated plumbing are not shown as part of the schematic for clarity purposes because they do not form part of the present invention. The upper end unit 44, the stack 42, the base plate 48 and the lower end unit 46 are shown enclosed in a thermal envelope 58. According to the invention, a WVT unit 60 and a CAC 62 are integrated within the lower end unit 46. The WVT unit 60 and the CAC 62 can be of any suitable design for the purposes described herein, many of which are know in the art.

The stack cooling fluid enters the module 40 on line 64 and exits the module 40 on line 66. A cooling fluid pump 68 configured within the end unit 46 pumps the cooling fluid through the module 40 and the coolant loop 24 outside of the module 40. The cooling fluid flows through the cooling fluid flow channels in the stack 42. A cooling fluid by-pass valve 70 is provided in the end unit 44, and is opened to by-pass the flow channels in the stack 42 for cold-starts. A reservoir 72 is provided to replenish the cooling fluid. The warm cooling fluid from the fuel cell stack 42 is sent to the CAC 62, and provides the cooling fluid for reducing the temperature of the cathode inlet air, as discussed above. For certain operating conditions, such as system start-up, low ambient temperatures and/or low power, the cooling fluid can be heated to increase the temperature of the stack 42 more quickly, which will also heat the cathode air flowing through the CAC 62. A variable position three-way valve 74 allows the cooling fluid to selectively by-pass the coolant loop 24. Thus, the valve 74 allows the cooling fluid to be recirculated within the thermal envelope 58 if it is below the operating temperature of the system.

The cathode inlet air from the compressor 14 is sent to the CAC 62 on line 80 where it is reduced in temperature by the stack cooling fluid on line 76. The reduced temperature cathode inlet air is then sent to the water vapor receiving side of the WVT unit 60 to be humidified. The humidified cathode inlet air is then sent to the cathode flow channels in the fuel cell stack 42 on line 82. The wet cathode exhaust gas from the fuel cell stack 42 is output therefrom on line 84 and is sent to the water vapor donating side of the WVT unit 60 to provide the humidification for the cathode inlet air, as discussed above. A humidifier by-pass valve 86 is provided in the line 84, and can be opened to by-pass the WVT unit 60 and send the cathode exhaust gas directly to a cathode exhaust gas outlet line 88. The valve 86 can be a variable position valve that selectively allows some of the cathode exhaust gas to flow through the water vapor donating side of the WVT unit 60 and some of the cathode exhaust gas to by-pass the water vapor donating side of the WVT unit 60.

As discussed above, the present invention proposes configuring the CAC 62, the WVT unit 60 and other components in end hardware of a fuel cell stack in a thermally integrated assembly. Thus, any change in the temperature of one component or fluid in the module 40 will be limited by the temperature of other components and fluids in the module so that the entire thermal mass is stable.

By integrating the CAC 62 and the WVT unit 60 in the end unit 44 and using low thermal conductivity materials for the structure, the CAC 62 and the WVT unit 60 will remain warm for a longer period of time after system shut-down, thus reducing the depth of the next system cold-start. During start-up of the fuel cell system, an end cell heater (not shown) typically located over the active area of the end cell of the stack 12, would warm the WVT unit 60. The end cell heater could be provided in the base plate 48. The cooling fluid flow through the stack 42 can be turned off until the fuel cell stack 42 has reached a predetermined temperature. Until then, the cathode exhaust gas will be warming up, generally within 10 seconds, and begin warming the WVT unit 60. When the pump 68 is turned on and the cooling fluid begins to flow, the warm cooling fluid transfers heat into the CAC 62 to warm the air entering the WVT unit 60. Further, heat conducted through the cooling fluid passages can externally warm the WVT unit 60. Because of this configuration, the WVT unit 60 cannot be over-heated as long as cooling fluid is flowing through the module 40.

As the temperature of the WVT unit 60 approaches a nominal operating temperature of the stack 42, the cooling fluid flow dominates the temperature control. It has been discovered that for certain humidifier materials, water vapor transfer performance is not adversely affected by temperatures up to about 95° C. Such materials can enhance the performance of the WVT unit 60 to help reduce its size and cost.

The WVT unit 60 can be designed to provide a desirable cathode back-pressure so that the cathode back-pressure valve (not shown) normally provided in a fuel cell system can possibly be eliminated.

The by-pass valve 86 allows the cathode exhaust gas to by-pass the WVT unit 60 so that the cathode inlet airflow is not significantly humidified. Alternately, a by-pass valve (not shown) can be provided to allow the cathode inlet air to by-pass the WVT unit 60 so that it is maintained substantially dry. Operating conditions where a dry cathode inlet air is desired could include a cold stack start-up, where the water vapor introduced in the cold stack may condense into water. Further, during stack shut-down it may be desirable to open the by-pass valve 86 to purge the cathode flow channels, diffusion medias and MEAs of the fuel cell stack 42 of water for freeze purposes.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell stack module comprising:
a fuel cell stack;
a stack end unit coupled to and separate from the fuel cell stack as part of an integrated assembly;
a charge air cooler positioned within the stack end unit; and
a water vapor transfer unit positioned within the stack end unit, wherein the charge air cooler receives a cathode inlet airflow and reduces the temperature of the cathode inlet airflow, said water vapor transfer unit receiving the cooled cathode inlet airflow from the charge air cooler and sending it to a cathode side of the fuel cell stack, wherein the water vapor transfer unit receives a flow of cathode exhaust gas from the fuel cell stack to provide humidification to humidify the cathode inlet air.

2. The module according to claim 1 further comprising a cooling fluid loop flowing through the stack end unit and providing a cooling fluid to cool the fuel cell stack, said cooling fluid flowing through the cooling fluid loop being received by the charge air cooler to reduce the temperature of the cathode inlet airflow.

3. The module according to claim 2 further comprising a cooling fluid pump positioned within the stack end unit, said cooling fluid pump pumping the cooling fluid through the cooling fluid loop.

4. The module according to claim 2 further comprising a variable position cooling fluid by-pass valve for selectively causing the cooling fluid to recirculate within the module.

5. The module according to claim 4 wherein the cooling fluid by-pass valve is positioned within the stack end unit.

6. The module according to claim 1 further comprising a water vapor transfer unit by-pass valve for preventing the cathode inlet airflow from being humidified.

7. The module according to claim 6 wherein the water vapor transfer unit by-pass valve prevents or reduces a humidifying gas from flowing through the water vapor transfer unit.

8. The module according to claim 6 wherein the water vapor transfer unit by-pass valve prevents the cathode inlet air from flowing through the water vapor transfer unit.

9. The module according to claim 1 wherein the fuel cell stack and the stack end unit are integrated within a thermal envelope.

10. A fuel cell stack module comprising:
a fuel cell stack;
a stack end unit coupled to and separate from the fuel cell stack as part of an integrated assembly;
a thermal envelope enclosing the fuel cell stack and the stack end unit;
a charge air cooler positioned within the stack end unit, said charge air cooler receiving a cathode inlet airflow;
a cooling fluid loop flowing through the stack end unit and providing a cooling fluid to cool the fuel cell stack, said cooling fluid flowing through the cooling fluid loop being received by the charge air cooler to reduce the temperature of the cathode inlet airflow; and
a water vapor transfer unit positioned within the stack end unit, said water vapor transfer unit receiving a cathode exhaust gas from the fuel cell stack and the cooled cathode inlet airflow from the charge air cooler and sending a humidified airflow to a cathode side of the fuel cell stack.

11. The module according to claim 10 further comprising a cooling fluid pump positioned within the stack end unit, said cooling fluid pump pumping the cooling fluid through the cooling fluid loop.

12. The module according to claim 11 further comprising a variable position cooling fluid by-pass valve for selectively causing the cooling fluid to recirculate within the module.

13. The module according to claim 12 wherein the cooling fluid by-pass valve is positioned within the stack end unit.

14. The module according to claim 10 further comprising a water vapor transfer unit by-pass valve for preventing the cathode exhaust gas from flowing through the water vapor transfer unit.

15. A fuel cell stack module comprising:
a fuel cell stack;
a charge air cooler; and
a water vapor transfer unit, wherein the fuel cell stack, the charge air cooler and the water vapor transfer unit are all integrated within a common thermal envelope, and wherein the water vapor transfer unit and the charge air cooler are enclosed within a separate unit from the fuel cell stack, said water vapor transfer unit receiving a flow of cathode exhaust gas from the fuel cell stack to provide humidification to humidify the cathode inlet air.

16. The module according to claim 15 further comprising a cooling fluid pump integrated within the thermal envelope.

17. The module according to claim 15 further comprising a water vapor transfer unit by-pass valve integrated within the thermal envelope.

18. The module according to claim 15 further comprising a variable position three-way cooling fluid recirculating valve integrated within the thermal envelope.

* * * * *